July 5, 1932.  F. FRASER  1,865,894
APPARATUS FOR FORMING AND ANNEALING SHEET GLASS
Filed Nov. 24, 1930  2 Sheets-Sheet 1
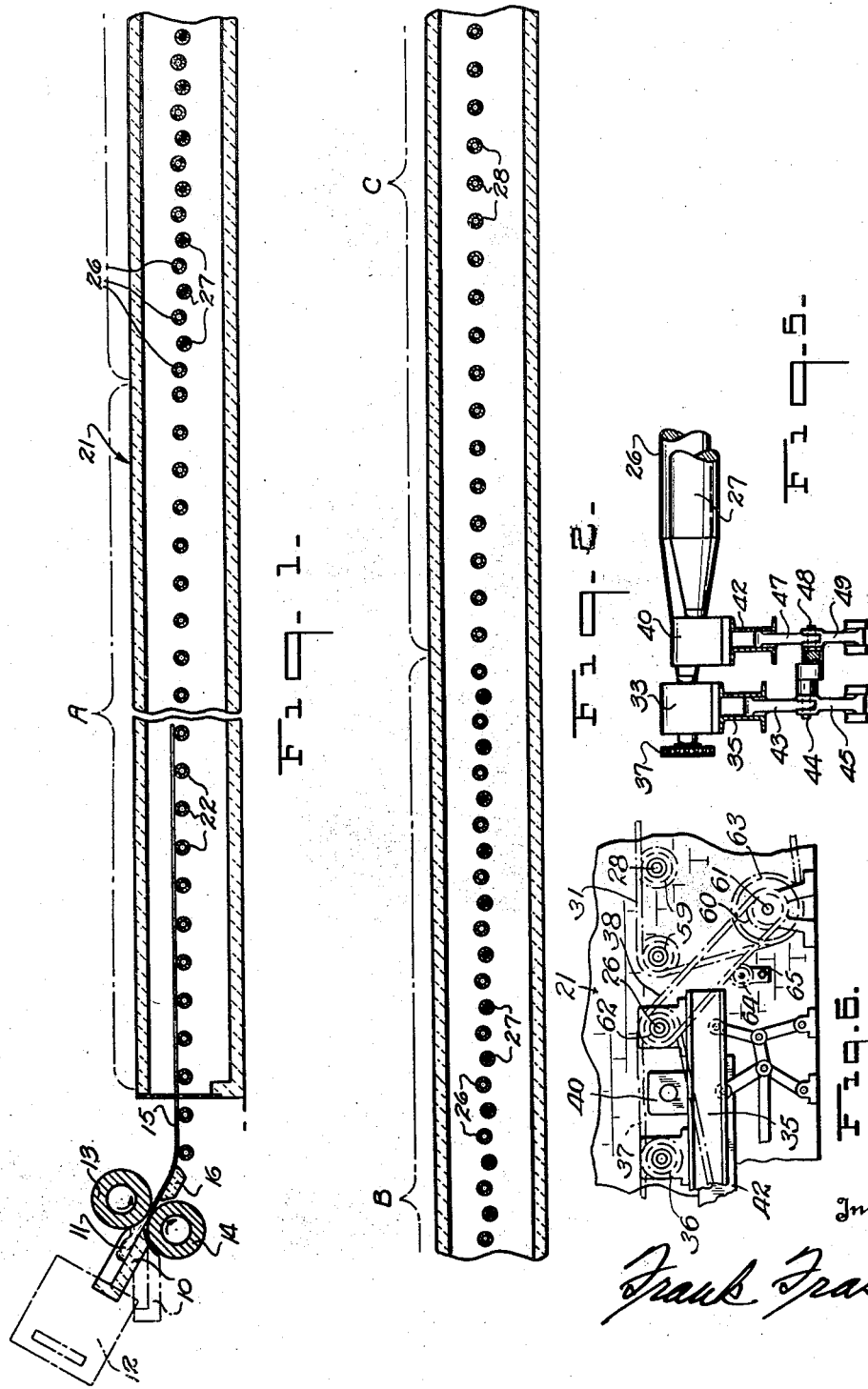

July 5, 1932.  F. FRASER  1,865,894
APPARATUS FOR FORMING AND ANNEALING SHEET GLASS
Filed Nov. 24, 1930  2 Sheets-Sheet 2
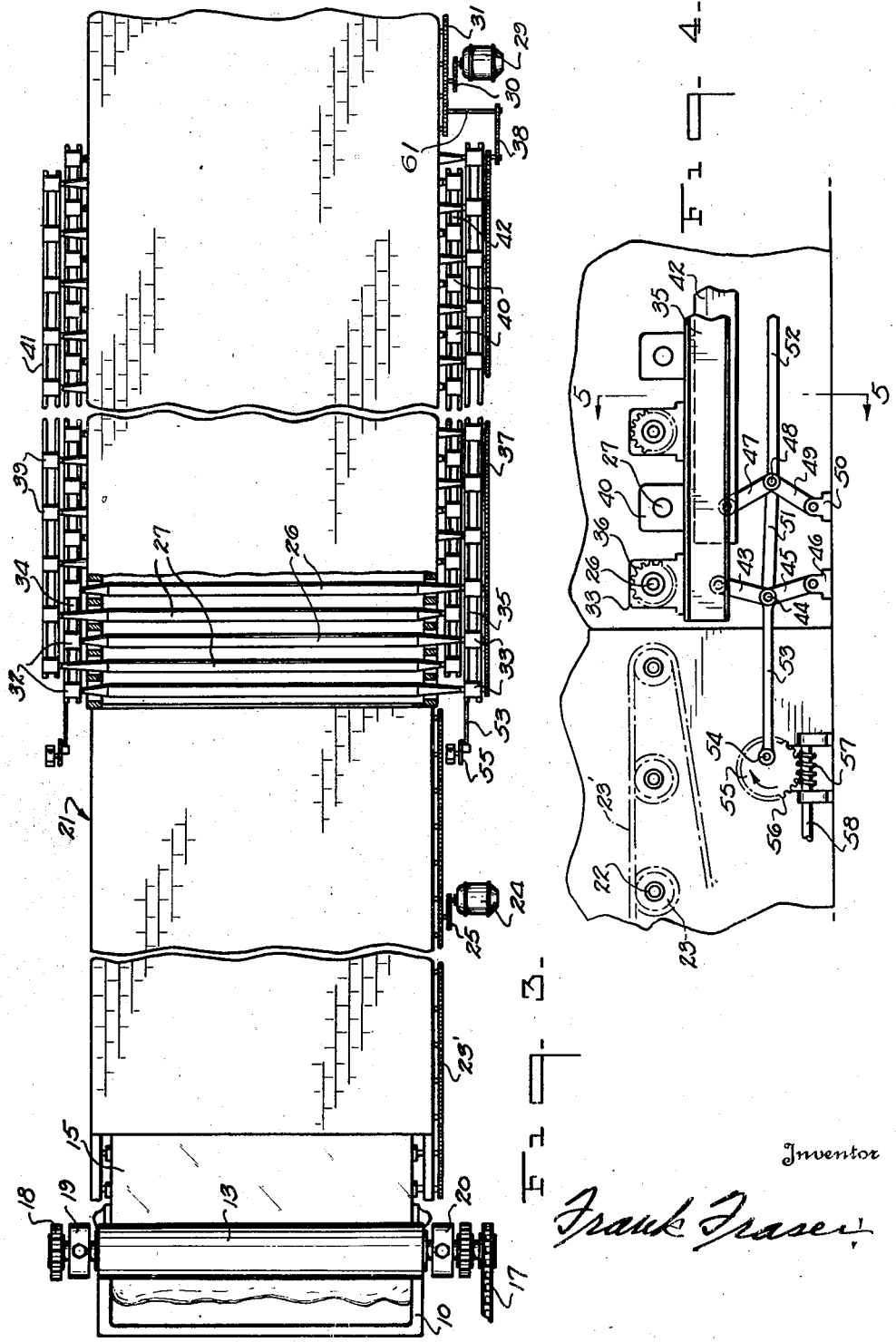
Inventor
Frank Fraser Patented July 5, 1932

1,865,894

UNITED STATES PATENT OFFICE

FRANK FRASER, OF TOLEDO, OHIO, ASSIGNOR TO LIBBEY-OWENS-FORD GLASS COMPANY, OF TOLEDO, OHIO, A CORPORATION OF OHIO

APPARATUS FOR FORMING AND ANNEALING SHEET GLASS

Application filed November 24, 1930. Serial No. 497,791.

The present invention relates to improvements in apparatus for forming and annealing sheet or plate glass.

According to the invention, a plurality of successive sheets of glass are adapted to be formed by an intermittent casting and rolling operation. It is desirable, in order to increase production and improve the quality of the glass sheets, that they be formed at a relatively high rate of speed such as, for example, in the neighborhood of sixty feet per minute, although this speed may be increased or decreased, as preferred. A considerable length of time is ordinarily required to properly anneal the glass sheets so that were the sheets carried entirely through the annealing leer at the same high rate of speed at which they are formed, it will be apparent that the leer would necessarily have to be of considerable length.

The object of this invention, therefore, resides broadly in the provision of apparatus wherein the glass sheets may be formed at a relatively high rate of speed and subsequently annealed while traveling at a speed relatively less than the forming speed, the forward speed of travel of the sheet being reduced subsequent to its formation and preferably at the beginning of the annealing operation to the end that the apparatus herein provided will embody those advantages incident to the rapid reduction of the molten glass to sheet form and likewise those advantages which result from slower annealing of the glass such as, for example, a material reduction in the length of leer necessary to properly anneal the glass.

Heretofore, various schemes have been proposed for effecting the desired reduction in the speed of forward travel of the sheet. However, in practically all of such schemes, various types of mechanisms were associated with the rolls of the roller conveyors for effecting the desired change in the speed thereof. According to the present invention, the forward speed of travel of the sheet is reduced in an easy and convenient manner and without the use of complicated speed changing mechanisms. Thus, the high speed rolls of the roller conveyor are always driven at a constant speed, and the low speed rolls are always driven at a constant slow speed so that, in order to effect the desired change in the forward speed of travel of the sheet, no change in the speed of rotation of the individual rolls is required.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through the forward end portion of apparatus provided by the present invention, Fig. 2 is a similar view showing a continuation of the apparatus, Fig. 3 is a plan view of Fig. 1, Fig. 4 is a side elevation disclosing the means for vertically adjusting certain of the sheet supporting and conveying rolls, Fig. 5 is a section taken substantially on line 5—5 of Fig. 4, and Fig. 6 is a side elevation of a portion of the annealing leer showing the means for driving the sheet supporting and conveying rolls.

Referring to the drawings, the means herein employed in the formation of the glass sheets comprises a receiver or support 10 upon which is adapted to be deposited a mass of molten glass 11 which is to be reduced to sheet form. This mass of molten glass is preferably supplied to the receiver 10 when the same is in a substantially horizontal position from a suitable pot or receptacle 12 within which the molten glass has been preferably melted and refined. After the glass has been deposited upon the receiver, the pot is removed and the said receiver tilted upwardly to cause the molten glass to be passed to and between a pair of sheet forming rolls 13 and 14 associated with one end of the receiver and spaced from one another to create a sheet forming pass therebetween, through which the molten glass is moved and reduced to a sheet 15 of substantially predetermined and uniform thickness.

An inclined apron or chute 16 may be positioned as shown to receive the glass sheet issuing from between the forming rolls and to guide and support the same during its inclined downward travel.

Adapted to receive the sheet from the forming machine and preferably positioned closely adjacent thereto is an annealing leer 21 containing a large number of sheet supporting and conveying rolls which are divided into three units or sections A, B and C; the section A being termed the receiving section, B the transfer or speed changing section, and C the annealing section. The receiving section A is composed of a plurality of horizontally aligned rolls 22 adapted to be driven at a constant relatively high speed in any desired manner such as by associating with one end of each roll a sprocket 23, and in training about all of these sprockets a single sprocket chain 23′ driven from a motor 24 through reduction gearing 25. The transfer section B is composed of a plurality of constant low speed rolls 26 (driven at annealing speed) and a plurality of idler rolls 27, the low speed rolls and idler rolls being arranged alternately with respect to one another, as shown. The annealing section C of the leer is composed of a plurality of low speed rolls 28 driven at a constant slow annealing speed from a motor 29 through suitable reduction gearing 30 and a chain and sprocket drive, the sprockets 59 being associated with the rolls, and the sprocket chain 31 being trained thereabout.

In accordance with the present invention, the low speed rolls 26 and the idler rolls 27 respectively are adjustably mounted so that they may be moved vertically relative to one another into and out of sheet supporting position, said sets of rolls being adapted to provide for a change in the speed of forward travel of the glass sheet from its relatively high forming speed to its relatively slower annealing speed. To this end, the low speed rolls 26 are journaled at their opposite ends in bearings 32 and 33 mounted upon the longitudinally extending supporting members 34 and 35, each roll carrying at one end thereof a sprocket 36 about which sprockets is trained a sprocket chain 37 driven, as here shown, from the motor 29 through a sprocket chain 38. This sprocket chain 38 is trained about a sprocket 60 carried by shaft 61 and also about a sprocket 62 keyed to the first adjacent low speed roll 26 outwardly of the sprocket 36. Also mounted upon shaft 61 is a relatively large sprocket 63 about which the sprocket chain 31, driving rolls 28, is trained, this sprocket chain being driven as pointed out above from the motor 29 through suitable reducing gearing 30. In order to maintain the sprocket chain 38 tight during raising and lowering of the low speed rolls 26, there is provided a chain tightener consisting, as here shown, of a sprocket 64 engaging the lower inclined run of chain 38, said sprocket 64 being carried by a bracket 65 secured to the side wall of the annealing leer. In Fig. 6 the low speed rolls 26 are shown in their elevated or raised position at which time the sprocket chain 38 is maintained tight without the aid of chain tightener 64. Upon lowering of the rolls 26, any slack occurring in the chain 38 will be taken up by the tightening sprocket 64. Of course, no such tightening or compensating means is necessary for the sprocket chain 37 inasmuch as this chain simply moves bodily up and down with the rolls 26. The idler rolls 27 are freely journaled at their opposite ends in bearings 39 and 40 mounted upon the longitudinally extending supporting members 41 and 42 respectively.

Any preferred means may be provided for raising and lowering the low speed rolls 26 and idler rolls 27, one conventional way in which this might be accomplished being illustrated particularly in Figs. 4 and 5. Thus, each of the supporting members 34 and 35 for the low speed rolls 26 has pivoted thereto adjacent its front and rear ends a depending link 43 pivotally connected with the transverse pin 44 to which is also pivotally connected a link 45 pivoted at its lower end to a fixed block 46. Likewise, there is pivoted at each end of each of the supporting members 41 and 42 for the idler rolls 27 a link 47 pivotally connected to a pin 48 to which is also pivotally connected a link 49 pivoted at its lower end to a stationary block 50.

Extending between and connecting the pairs of links 43—45 and 47—49 at each end of the longitudinally extending supporting members is a connecting rod 51, while a connecting rod 52 is provided for connecting the pins 48 at the opposite ends of the supporting members. Pivotally associated with the pin 44 at each side of the leer is a pitman 53 pivoted as at 54 to an eccentric 55, said eccentric carrying a worm gear 56 meshing with and driven from a worm 57 carried by drive shaft 58. The pairs of links 43—45 and 47—49 are so associated with one another, as indicated in Fig. 4 that, upon rotation of eccentric 55, one pair of links will be folded or, in other words, moved toward one another, while the opposite pair will be extended or moved to a vertical position, dependent upon the direction of rotation of said eccentric. In this manner, it will be apparent that upon rotation of the eccentric in the direction indicated by the arrow in Fig. 4, the low speed rolls 26 will be raised into sheet supporting position and the idler rolls 27 lowered out of sheet contacting position and that, when the eccentric is rotated in the reverse direction, the low speed rolls will be lowered and the idler rolls raised.

In carrying out the present invention, the idler rolls 27 of transfer section B are first raised to the same level as the rolls 22 of receiving section A. The glass sheet is preferably formed at a relatively high rate of speed such as, for example, in the neighborhood of sixty feet per minute and is annealed while traveling at a much slower speed which may be, for example, approximately five feet per minute. However, these speeds are given merely to illustrate the operation of the invention and other relative speeds may be used. In forming the sheet, a mass of molten glass 11 is first deposited upon receiver 10 and then passed between the forming rolls 13 and 14 and reduced to sheet form, the sheet 15 being carried forwardly into the leer 21 and upon rolls 22. The rolls 22 are driven at a high rate of speed to carry the sheet forwardly at its speed of formation until it has become substantially set, after which the sheet passes from the said rolls 22 onto the elevated idler rolls 27 of transfer section B. As the sheet runs onto the idler rolls, it will be gradually slowed down and, after being preferably brought to a complete stop, the slow speed rolls 26 are raised and the idler rolls 27 lowered so as to transfer the sheet from the idler rolls to the low speed rolls. The low speed rolls 26 will then function to carry the sheet forwardly and deliver it onto the low speed rolls 28 which carry it through the leer at annealing speed. It will, of course, be understood that the rolls 26 of transfer section B are driven at a speed equal to the speed of rolls 28.

Although the sheet is preferably brought to a complete stop before being shifted from the idler rolls 27 onto the low speed rolls 26, it will be appreciated that the transfer of the sheet from the idler rolls to the low speed rolls can be effected as soon as the speed of forward travel of the sheet has been reduced to approximately annealing speed. From the above, it will be apparent that the high speed rolls 22 are always driven at a constant high speed substantially equal to the speed of formation of the sheet and that the low speed rolls 26 and 28 are always driven at a relatively slow annealing speed. Consequently, the forwardly moving sheet may be reduced from its relatively high forming speed to a relatively slower annealing speed easily and conveniently and without the use of any complicated speed changing mechanism, since it is at no time necessary to vary the speed of rotation of the high and low speed rolls.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, an annealing leer, and conveying means for receiving a newly formed sheet thereupon and carrying it into and through said leer, said conveying means embodying a receiving section, an annealing section, and a transfer section interposed between said receiving and annealing sections and including two sets of rolls with the rolls of one set being arranged alternately with the rolls of the other set, means for positively driving one set of rolls at a relatively slow speed, the rolls of the other set being idler rolls, and means for moving one set of rolls vertically relative to the other set.

2. In sheet glass apparatus, an annealing leer, and conveying means for receiving a newly formed sheet thereupon and carrying it into and through said leer, said conveying means embodying a receiving section, means for driving said section at a constant relatively high rate of speed, an annealing section, means for driving said annealing section at a constant relatively slow speed, and a transfer section interposed between said receiving and annealing sections and including two sets of rolls with the rolls of one set being arranged alternately with the rolls of the other set, means for positively driving one set of rolls at a relatively slow speed substantially equal to the speed of said annealing section, the rolls of the other set being idler rolls, and means for moving one set of rolls vertically relative to the other set.

3. In sheet glass apparatus, an annealing leer, and conveying means for receiving a newly formed sheet thereupon and carrying it into and through said leer, said conveying means embodying a receiving section, an annealing section, and a transfer section interposed between said receiving and annealing sections and including two sets of rolls with the rolls of one set being arranged alternately with the rolls of the other set, means for positively driving one set of rolls at a relatively slow speed, the rolls of the other set being idler rolls, and means for moving said sets of rolls vertically relative to one another in a manner that the idler rolls are first brought into position to receive the sheet from the receiving section, after which said sheet is transferred from the idler rolls onto the low speed rolls and delivered thereby onto said annealing section.

4. In sheet glass apparatus, an annealing leer, and conveying means for receiving a newly formed sheet thereupon and carrying it into and through said leer, said conveying means embodying a receiving section, means for driving said section at a constant relatively high rate of speed, an annealing section, means for driving said annealing section at a constant relatively slow speed, and a transfer section interposed between said receiving and annealing sections and including two sets of rolls with the rolls of one set being arranged alternately with the rolls of the other set, means for positively driving one set of rolls at a relatively slow speed substantially equal to the speed of said annealing section, the rolls of the other set being idler rolls, means for moving one set of rolls vertically relative to the other set, and means for moving said sets of rolls vertically relative to one another in a manner that the idler rolls are first brought into position to receive the sheet from the receiving section, after which said sheet is transferred from the idler rolls onto the low speed rolls and delivered thereby onto said annealing section.

5. In a sheet glass apparatus, a conveyor for receiving a newly formed sheet thereupon at a relatively high rate of speed and delivering it therefrom at a relatively slower speed, including two sets of rolls with the rolls of one set being arranged alternately with the rolls of the other set, means for positively driving one set of rolls at a relatively slow speed, the rolls of the other set being idler rolls which are adapted to receive the sheet thereupon at a relatively high speed, and means for moving one set of rolls vertically relative to the other set in a manner to transfer the sheet from the idler rolls onto the driven rolls.

Signed at Toledo, in the county of Lucas and State of Ohio, this 21st day of November, 1930.

FRANK FRASER.